United States Patent
Frelicot

(10) Patent No.: US 10,493,710 B2
(45) Date of Patent: Dec. 3, 2019

(54) CORRECTION OF LOCALIZED TIRE SURFACE ANOMALIES

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventor: Dan D. Frelicot, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 712 days.

(21) Appl. No.: 15/024,111

(22) PCT Filed: Sep. 11, 2014

(86) PCT No.: PCT/US2014/055061
§ 371 (c)(1),
(2) Date: Mar. 23, 2016

(87) PCT Pub. No.: WO2015/047734
PCT Pub. Date: Apr. 2, 2015

(65) Prior Publication Data
US 2016/0236430 A1    Aug. 18, 2016

Related U.S. Application Data

(60) Provisional application No. 61/882,655, filed on Sep. 26, 2013.

(51) Int. Cl.
B29D 30/06    (2006.01)
G01M 17/02    (2006.01)

(52) U.S. Cl.
CPC ....... *B29D 30/0633* (2013.01); *G01M 17/024* (2013.01); *B29D 2030/0638* (2013.01)

(58) Field of Classification Search
None
See application file for complete search history.

(56) References Cited

U.S. PATENT DOCUMENTS

| 3,963,427 A | 6/1976 | Ugo |
| 4,016,020 A * | 4/1977 | Ongaro .................. B24B 5/366 156/154 |

(Continued)

FOREIGN PATENT DOCUMENTS

| JP | S60-108501 | 7/1985 |
| JP | 8001820 | 1/1996 |

(Continued)

OTHER PUBLICATIONS

PCT International Search Report for PCT/US2014/55061, dated Dec. 16, 2014—9 pages.

*Primary Examiner* — Monica A Huson
*Assistant Examiner* — Kelsey C Grace
(74) *Attorney, Agent, or Firm* — Dority & Manning, P.A.

(57) ABSTRACT

Systems and methods for improving tire uniformity, for instance to reduce cavity noise and other effects caused by localized tire surface anomalies are provided. The localized tire surface anomaly can be manifested as a local peak of radial nm out or other uniformity parameter (e.g. radial force variation) for the tire. The local peak of radial run out can be within uniformity tolerances for radial run out, but can still contribute to cavity noise through the high harmonic effects caused by the local peak. According to aspects of the present disclosure, the location and/or other identifiable characteristics of a localized tire surface anomaly can be identified. An ablation device can be used on the tread of the tire to (Continued)

remove tire material at an azimuthal location associated with the localized tire surface anomaly to improve the uniformity of the tire.

12 Claims, 9 Drawing Sheets

(56) References Cited

U.S. PATENT DOCUMENTS

| | | |
|---|---|---|
| 5,537,866 A | 7/1996 | Bangert et al. |
| 5,643,472 A | 7/1997 | Engelsberg et al. |
| 5,688,355 A | 11/1997 | Yu |
| 5,718,036 A | 2/1998 | Oji et al. |
| 5,780,806 A | 7/1998 | Ferguson et al. |
| 6,114,651 A | 9/2000 | Schluter et al. |
| 6,139,401 A | 10/2000 | Dunn et al. |
| 6,257,956 B1 | 7/2001 | Shteinhauz et al. |
| 7,012,701 B2 | 3/2006 | Hassler et al. |
| 7,096,150 B2 | 8/2006 | Shavers et al. |
| 7,379,483 B2 | 5/2008 | Denney et al. |
| 7,452,476 B2 | 11/2008 | Bayer et al. |
| 7,531,283 B2 | 5/2009 | Darcy et al. |
| 8,016,968 B2 | 9/2011 | Roetker et al. |
| 8,231,428 B2 | 7/2012 | Poling et al. |
| 8,972,035 B2 | 3/2015 | Hair, Jr. et al. |
| 2004/0074292 A1 | 4/2004 | Irwin et al. |
| 2005/0268707 A1 | 12/2005 | Dale, Jr. et al. |
| 2006/0231191 A1 | 10/2006 | Mawby et al. |
| 2010/0189664 A1 | 7/2010 | Castro et al. |
| 2011/0056284 A1 | 3/2011 | Hanada et al. |
| 2011/0114251 A1 | 5/2011 | Mawby et al. |
| 2012/0020526 A1 | 1/2012 | Teti et al. |
| 2012/0035756 A1 | 2/2012 | Voss et al. |
| 2012/0095587 A1 | 4/2012 | Hair, Jr. et al. |
| 2013/0098148 A1 | 4/2013 | Mawby et al. |

FOREIGN PATENT DOCUMENTS

| | | |
|---|---|---|
| WO | WO1998/008070 | 2/1998 |
| WO | WO2010/071657 | 6/2010 |
| WO | WO2010071657 | 6/2010 |
| WO | WO 2010/080571 | 7/2010 |
| WO | WO2012074527 | 6/2012 |
| WO | WO2012150948 | 11/2012 |
| WO | WO 2013/039505 | 3/2013 |

* cited by examiner

CORRECTION OF LOCALIZED TIRE SURFACE ANOMALIES

FIELD

The present disclosure relates generally to systems and methods for improving tire uniformity, and more particularly to analyzing and improving the uniformity of tires by correcting for localized tire surface anomalies on the tread of the tire.

BACKGROUND

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations, mass variance, and stiffness variations. Common measurements for assessing tire uniformity include geometric variation measurements (e.g. radial run out and lateral run out) and force variation measurements (e.g. radial force variation, lateral force variation and tangential force variation, sometimes also called longitudinal or fore and aft force variation). Uniformity measurement machines often measure the above and other uniformity characteristics by measuring force and/or geometry at a number of points around a tire as the tire is rotated about its axis.

Cavity noise in tires can be generated by the excitation of the air contained inside a closed tire cavity. When cavity noise appears when a tire is rolling on a smooth surface (e.g. during performance tests), the excitation of the air contributing to the cavity noise can be caused at least in part by tire non-uniformity, such as radial run out of the tire. For instance, a localized peak of radial run out of a tire caused, for instance, by a tire surface anomaly (e.g. a tread joint) can be within typical uniformity tolerances assessed during tire manufacturing. The local peak of radial run out, however, can generate high harmonics (e.g. harmonics greater than 10) of radial run out for the tire. These high harmonics of radial run out can lead to the excitation of air contributing to cavity noise.

Correction for radial run out caused by surface anomalies can be performed, for instance, by grinding the surface of the tread. This generalized grinding, however, is typically performed to address low harmonics of radial run out and other uniformity parameters for the tire. Moreover in certain circumstances, grinding the tread can create a displeasing appearance to the tread of the tire. In addition, grinding the tread can lead to the creation of other non-uniformity issues, such as the creation of tangential force variation.

Thus, a need exists for a system and method for reducing the harmonic contribution cause by a localized tire surface anomaly due to a tread joint or other tire characteristic. A system and method that can correct for multiple harmonics caused by the tire surface anomaly would be particularly useful. For instance, reduction of multiple harmonics, particularly higher order harmonics, can contribute to a reduction in cavity noise.

SUMMARY

Aspects and advantages of the invention will be set forth in part in the following description, or may be apparent from the description, or may be learned through practice of the invention.

One example aspect of the present disclosure is directed to a method for improving the uniformity of a tire. The method includes identifying a tire having a tread for uniformity correction. The method further includes identifying at least one localized tire surface anomaly on the tread of the tire and determining, by one or more computing devices, at least one identifiable characteristic of the localized tire surface anomaly. The method further includes determining, by the one or more computing devices, a material removal pattern to correct for the localized tire surface anomaly based at least in part on the at least one identifiable characteristic of the localized tire surface anomaly. The material removal pattern specifies a material removal depth for removing material from the tread of the tire at an azimuthal location associated with the localized tire surface anomaly. The method further includes removing tire material from the tread of the tire according to the material removal pattern.

Another example aspect of the present disclosure is directed to a uniformity correction system for improving the uniformity of a tire. The uniformity correction system includes a tire fixture configured to receive a tire for selective rotation. The uniformity correction system includes a uniformity measurement device configured to obtain a plurality of radial run out measurements at a plurality of different azimuthal locations about a tread of the tire and an ablation device configured to remove tire material from the tread of the tire. The uniformity correction system further includes a control system coupled to the ablation device and to the tire fixture. The control system is configured to identify a local peak of radial run out from the plurality of radial run out measurements. The control system is further configured to determine a material removal pattern based at least in part on the local peak of radial run out. The material removal pattern specifies a material removal depth for removing tire material from the tread of the tire to correct for the local peak of radial run out. The control system is further configured to control the tire fixture and the ablation device to remove tire material from the tread of the tire according to the material removal pattern.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 depicts azimuth about the tire along the abscissa and magnitude of radial run out (e.g. in millimeters) along the ordinate.

FIG. 7 plots the circumferential direction of the tread along the abscissa, the lateral width of the tread along the ordinate.

DETAILED DESCRIPTION

Figure 1:
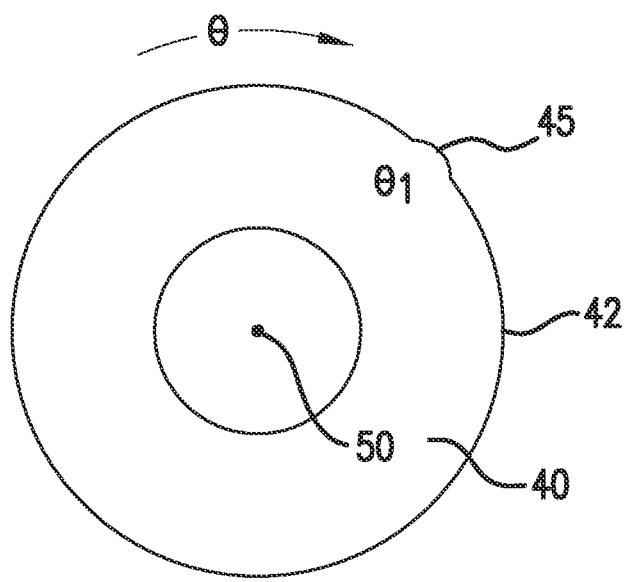
FIG. 1 depicts an example tire having a tire surface anomaly on the tread of the tire.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, example aspects of the present disclosure are directed to improving tire uniformity to reduce effects caused by a localized tire surface anomaly on the surface of tread of a tire. The localized tire surface anomaly can be caused by a joint in products used to construct a tire, such as a tread joint. The localized tire surface anomaly can be manifested as a local peak of radial run out or other uniformity parameter (e.g. radial force variation) for the tire. The local peak of radial run out can be within uniformity tolerances for radial run out, but can still contribute to effects such as cavity noise via the high harmonic effects caused by the local peak. According to aspects of the present disclosure, the location and/or other identifiable characteristics of the localized tire surface anomaly can be identified. A material removal device can be used on the tread of the tire to remove tire material at an azimuthal location associated with the localized tire surface anomaly to improve the uniformity of the tire.

As used herein, a "localized tire surface anomaly" refers to an anomaly on the surface of the tread of the tire that is associated with a narrow azimuthal window (e.g. less than 20°) on the surface of the tire. A "local peak of radial run out" refers to any local maximum in radial run out measurements performed for a plurality of azimuthal locations about the tire. A tire can have multiple local peaks of radial run out.

Aspects of the present disclosure will be discussed with reference to correcting a local peak of radial run out attributable to tread joint for purposes of illustration and discussion. Those of ordinary skill in the art, using the disclosures provided herein, will understand that aspects of the present disclosure can also be used to correct for local peaks of radial run out attributable to other localized tire surface anomalies without deviating from the scope of the present disclosure.

According to a particular aspect of the present disclosure, at least one identifiable characteristic of a localized tire surface anomaly can be determined for the tire. The at least one identifiable characteristic can include the location (e.g. the azimuthal location), shape, and size of the localized tire surface anomaly. The identifiable characteristic of the localized tire surface anomaly can be identified in numerous ways. For instance, the identifiable characteristic of the localized tire surface anomaly can be identified based on radial run out data measured for the tire, a tread surface map of the tire, and/or manufacturing data associated with the tire.

In a particular implementation, an approximate location of the localized tire surface anomaly can be identified based on, for instance, radial run out data, a tread surface map, and/or manufacturing data associated with the tire. More specific characteristics of the tire surface anomaly (e.g. size and/or shape) can be determined by scanning the tread of the tire at the estimated location of the localized tire surface anomaly using a scanning probe, such as a laser probe, an optical probe, or a camera probe.

Once the at least one identifiable characteristic of the localized tire surface anomaly has been identified, a material removal pattern can be determined to correct for the localized tire surface anomaly based at least on part on the at least one identifiable characteristic of the localized tire surface anomaly. The material removal pattern specifies a material removal depth for removing material from the tread of the tire at one or more azimuthal locations associated with the localized tire surface anomaly. The material removal depth specified by the material removal pattern can be determined based on the one or more identifiable characteristics. For instance, the material removal depth can be determined to remove a quantity of tire material determined based at least in part on the size of the localized tire surface anomaly. The particular material removal pattern can also be determined based on the shape of the localized tire surface anomaly. For instance, if the localized tire surface anomaly is a tread joint that is angled across the surface of the tread, the material removal pattern can be similarly angled across the surface of the tread to match the tread joint.

An ablation device can be used for removing tire material from the tread of the tire according to the material removal pattern. The ablation device can include or can be a part of a laser ablation system that includes a tire fixture on which a tire can be mounted for uniformity correction. A control system can control the laser ablation device and/or the tire fixture to remove tire material from tread of the tire to correct for the localized tire surface anomaly according to the material removal pattern. Laser ablation can be employed as a removal technique because it is able to accomplish removal depths and areas with precise control to correct for the localized tire surface anomaly. To the extent that other rubber removal techniques, such as but not limited to sandblasting, water jet removal and the like may be implemented to achieve the same precision levels as laser ablation, the present subject matter may also employ such alternative removal techniques.

Correction of a localized tire surface anomaly attributable to, for instance, a tread joint can reduce harmonic effects that can lead to, for instance, cavity noise. The precision that can be provided by an ablation system can allow for the precise correction of the localized tire surface anomaly. In particular, an ablation system can correct for the local localized tire surface anomaly by removing tire material from a narrow window on the tread of the tire. In this way, uniformity improvement can be obtained by removing reduced quantities of tire material from the tread of the tire. In addition, the use of ablation can help preserve the appearance of the tread of the tire by smoothing the localized tire surface anomaly on the tread of the tire.

Example Tire with Localized Tire Surface Anomaly

FIG. 1 provides a schematic illustration of a tire 40 that can be identified for uniformity correction in accordance with aspects of the present disclosure. The tire 40 can be constructed by assembling various tire products according to a suitable tire manufacturing process. The tire 40 is rotatable about a longitudinal central axis of rotation 50.

The tire 40 includes a tread 42. The tread 42 can be configured to contact a rolling surface for the tire. The tread 42 can be made of a rubber material and can include a tread pattern having one or more grooves. As shown in FIG. 1, the tread 42 of the tire can include a localized tire surface anomaly 45 at azimuth $\theta_1$. The localized tire surface anomaly 45 can be located in a narrow azimuthal window on the surface of the tread 42. As used herein, the azimuthal direction refers to the angular direction about the tire relative to a reference, such as a barcode on the tire. The azimuthal range for a tire can be 0° to 360°. The localized tire surface anomaly 45 can be attributable to a tread joint or other product joint in the tire.

Figure 2:
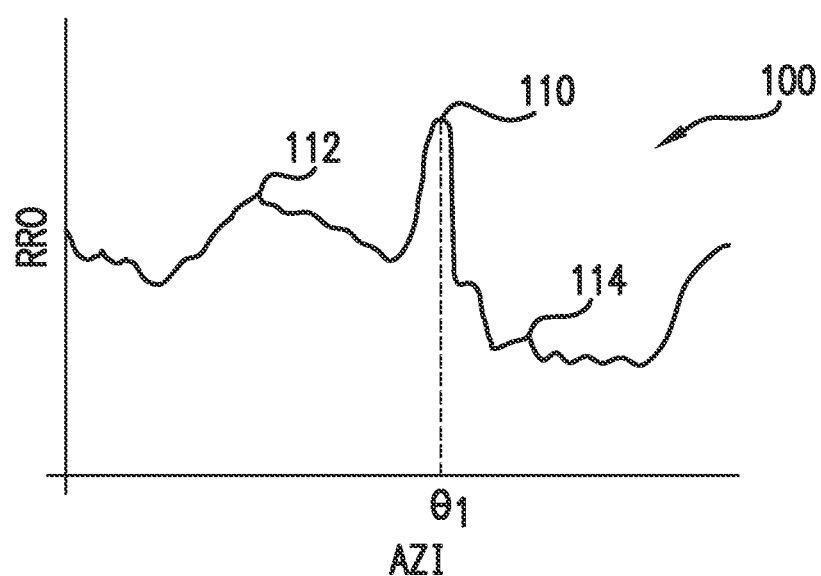
FIG. 2 depicts a graphical representation of radial run out measured for an example tire having a tire surface anomaly.

FIG. 2 depicts a graphical representation of a radial run out waveform 100 that can be measured for the tire 40 of FIG. 1. Radial run out is a uniformity parameter directed to the physical out of roundness or geometrical non-uniformity in the radial direction of a tire. The radial run out waveform 100 is representative of a plurality of radial run out measurements for a plurality of different azimuthal positions about the surface of the tire. The radial run out waveform 100 can be obtained from a number of data points measured at equally spaced angular locations during one rotation of a tire (e.g. 128, 256, 512, or other suitable number of data points) using a suitable uniformity measurement machine. The uniformity measurement machine can measure radial run out, for instance, using a sensor (e.g. a laser sensor) along one or more tracks as the tire is rotated relative to the sensor.

As shown in FIG. 2, the tire has a local peak of radial run out 110 at azimuth $\theta_1$. The tire can include other local peaks of radial run out, such as local peak 112 and local peak 114. As discussed above, a local peak of radial run out can be any local maximum in radial run out measurements performed for a plurality of azimuthal locations about the tire. The local peak 110 can be attributable to the localized tire surface anomaly 45 of FIG. 1. For instance, the local peak 110 can be attributable to a tread joint in the tire.

Figure 3:
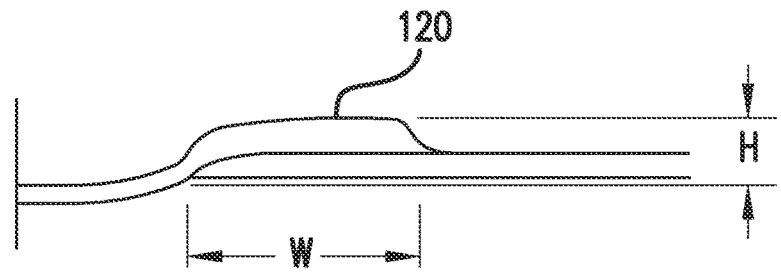
FIG. 3 depicts a cross-sectional view of an example tread joint that can be and/or can contribute to a localized tire surface anomaly.
Figure 4:
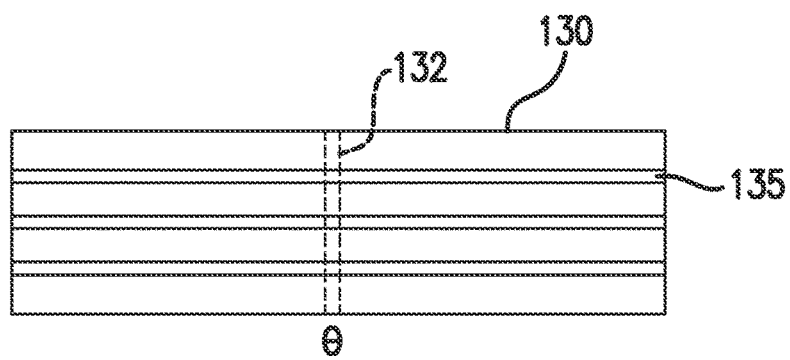
FIG. 4 depicts a plan view of a tread having an example tread joint that can be and/or can contribute to a localized tire surface anomaly.
Figure 5:
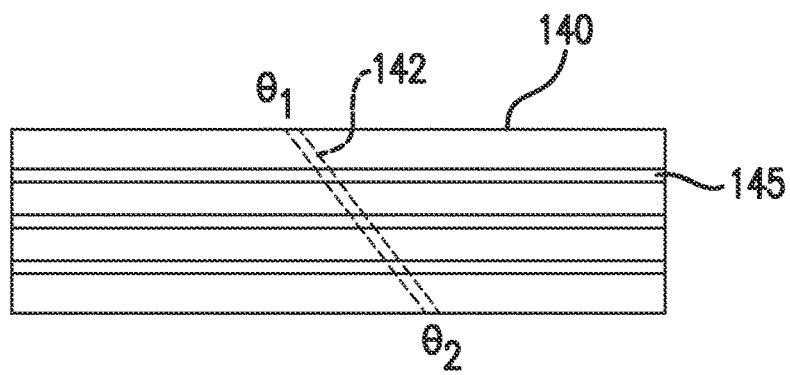
FIG. 5 depicts a plan view of a tread having an example tread joint that can be and/or can contribute to a localized tire surface anomaly.

FIG. 3 depicts a simplified cross-sectional view of an example tread joint 120 that can contribute to the local peak 110 of FIG. 2. The tread joint 120 of FIG. 3 can have various identifiable characteristics, such as azimuthal location about the tread of the tire, size (e.g. height H and width W), and shape. FIG. 4 depicts one example shape of a tread joint 132 across a tread 130 of a tire. The tread joint 132 extends perpendicularly across the tread 130 and is located at an azimuthal location $\theta$. The tread joint 132 can extend across grooves 135 in the tread 130. FIG. 5 depicts another example shape of a tread joint 142 across a tread 140 of a tire. The tread joint 142 is angled across the tread 140 from a first azimuthal location $\theta_1$ to a second azimuthal location $\theta_2$. The tread joint 142 extends across grooves 145 in the tread 140.

Referring back to FIG. 2, the local peak of radial run out 110 can contribute to high harmonics (e.g. harmonics above 10) of radial run out. These high harmonics can lead to, for instance, cavity noise. According to aspects of the present disclosure, cavity noise can be reduced by correcting for the local peak of radial run out 110 by removing material from the tread of the tire. Ablation (e.g. laser ablation) can allow for the precise removal of tire material in a narrow window along the tread of the tire.

The present disclosure is discussed with reference to correcting for a local peak of radial run out for purposes of illustration and discussion. Those of ordinary skill in the art, using the disclosures provided herein, should understand that localized tire surface anomalies can be manifested as other uniformity parameters (e.g. radial force variation). These other uniformity parameters can be analyzed and/or corrected using ablation on the tread of a tire without deviating from the scope of the present disclosure.

Example Method for Improving Tire Uniformity

Figure 6:
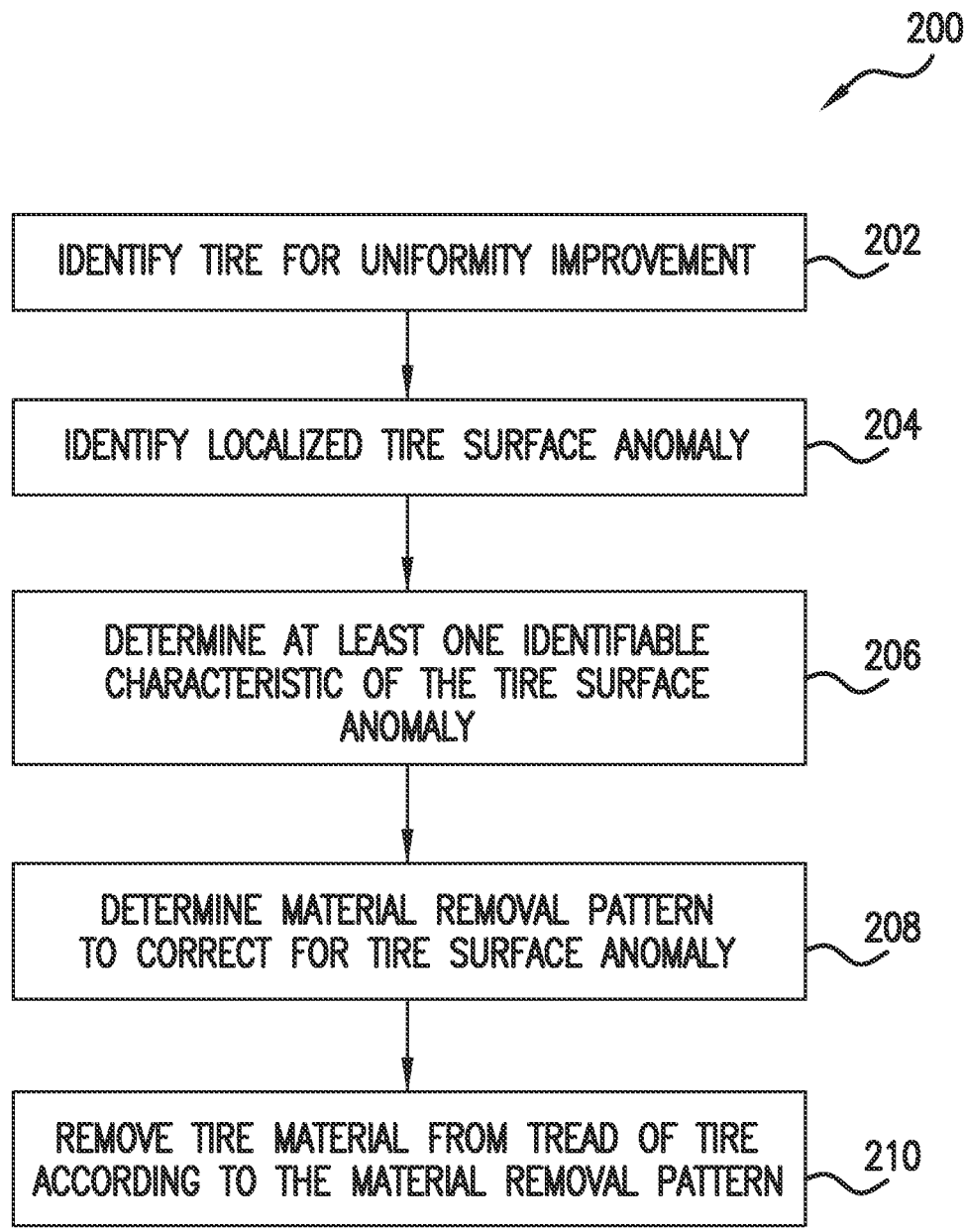
FIG. 6 depicts a flow diagram for an example method for improving the uniformity of a tire according to example aspects of the present disclosure.

FIG. 6 depicts a flow diagram of an example method (200) for improving tire uniformity according to an embodiment of the present disclosure. Although FIG. 6 depicts steps performed in a particular order for purposes of illustration and discussion, the methods discussed herein are not limited to any particular order or arrangement. One skilled in the art, using the disclosures provided herein, will appreciate that various steps of any of the methods disclosed herein can be omitted, rearranged, combined and/or adapted in various ways.

At (202), the method includes identifying a tire for uniformity improvement. Identifying a tire for uniformity improvement can include selecting any tire for uniformity analysis. For example, all tires or selected tires manufactured according to a tire manufacturing process can be identified for uniformity improvement according to aspects of the present disclosure.

At (204), a localized tire surface anomaly on the surface of the tire can be identified. The localized tire surface anomaly can be attributable to various characteristics of the tire, such as a tread joint in the tire. The localized tire surface anomaly can be identified, using one or more computing devices, based on data associated with the tire identified for uniformity improvement.

In one embodiment, the localized tire surface anomaly can be identified based at least in part on manufacturing data associated with a tire. The tire manufacturing data can be based on manufacturing characteristics associated with tires of similar tire construction manufactured according to the same tire manufacturing process. For instance, manufacturing data associated with a particular tire construction can indicate that a tread joint or other product joint in the tire is located at a particular azimuth on the tire relative to a bar code or other reference. The tread joint can be identified as a localized tire surface anomaly.

In another embodiment, the localized tire surface anomaly can be identified from a plurality of radial run out measurements performed for the tire. More particularly, a local peak of radial run out in the radial run out measurements can be indicative of a tire surface anomaly. FIG. 2 depicts a radial run out waveform 100 obtained for a tire. The radial run out waveform 100 can be analyzed to identify a local peak of radial run out, such as local peak 110. Local peak 110 can be indicative of the presence of a localized tire surface anomaly on the surface of the tire.

In another embodiment, a localized tire surface anomaly can be identified from a tread surface map. A tread surface map can include a set of data points providing a measure of tread height for a plurality of points about the surface of the tire. A tread surface map can provide a comprehensive map of the tread of the tire and can be analyzed to identify a localized tire surface anomaly.

The tread surface map can be obtained by a system that can include a laser probe, sonic probe, optical probe, video probe (using stereo correlation imaging techniques), or other probe or device for measuring data associated with the tread (e.g. tread heights) of the tire. For instance, a laser probe can collect data associated with tread height (e.g. distance from the laser probe to the tread surface) using a laser mapping process by impinging the surface of the tread with a laser beam as the tire is rotated using a rotator device, such as a stepper motor.

Figure 7:
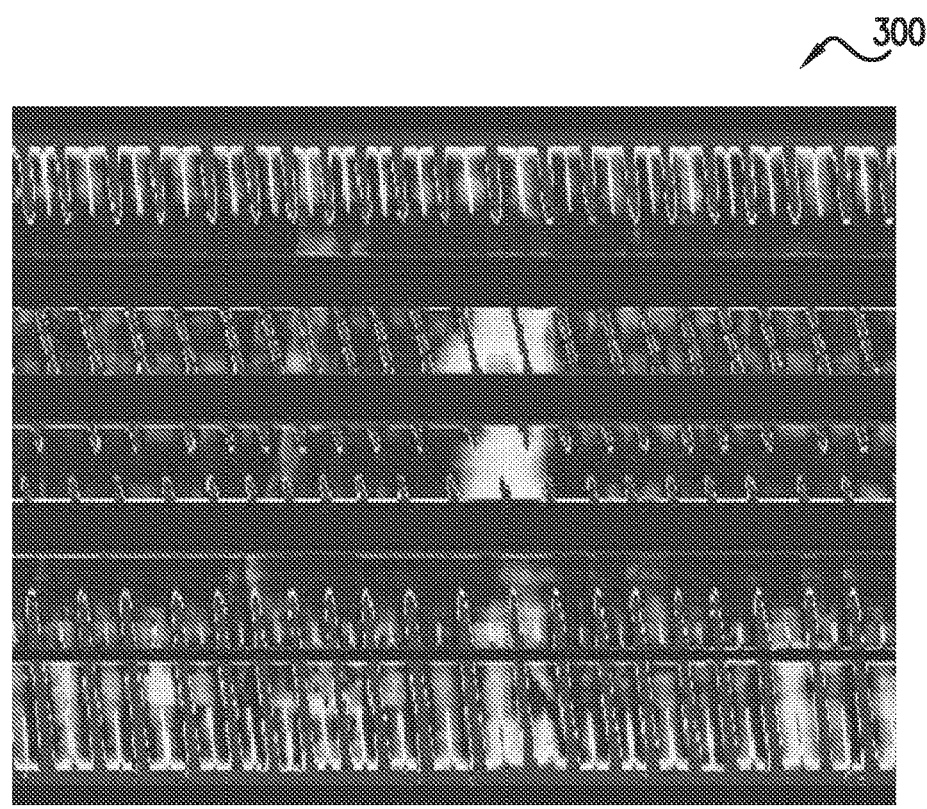
FIG. 7 depicts an example tread surface map that can be analyzed to identify a localized tire surface anomaly according to example aspects of the present disclosure.

FIG. 7 depicts an example tread surface map 300. FIG. 7 plots the tread surface map 300 with the circumferential direction of the tread along the abscissa and the lateral width of the tread along the ordinate. The tread surface map 300 includes a plurality of data points. Each data point is associated with a discrete location on the tread of a tire. Each data point provides a tread height for the discrete location. Data points in the tread surface map associated with a tread height that deviates a threshold from the remainder of tread heights can be indicative of the presence of a localized tire surface anomaly.

Referring back to FIG. 6 at (206), the method 200 can include determining at least one identifiable characteristic of the localized tire surface anomaly. For instance, the azimuthal location, size, and/or shape of localized tire surface anomaly can be determined. Similar to identifying the localized tread surface anomaly, the at least one identifiable characteristic of the localized tire surface anomaly can be determined, using one or more computing devices, based at least in part on data associated with tire. For instance, the at least one identifiable characteristic can be determined based at least in part on manufacturing data, radial run out measurements, and/or a tread surface map.

More particularly, in one implementation, the at least one identifiable characteristic can be identified from tire manufacturing data. As an example, tire manufacturing data can provide that a tread joint for a particular tire construction is located at a particular azimuth relative to a barcode or other reference on the tire. The tire manufacturing data can further provide the size of the tread joint, the quantity of tire material associated with the tread joint, and/or the shape of the tread joint.

In another implementation, the at least one identifiable characteristic can be identified from radial run out data measured for the tire. For instance, a radial run out waveform for the tire can be accessed and analyzed to identify one or more azimuthal positions of a local peak of radial run out. The size of the localized tire surface anomaly can be determined based at least in part on the amount of radial run out at the local peak.

Figure 8:
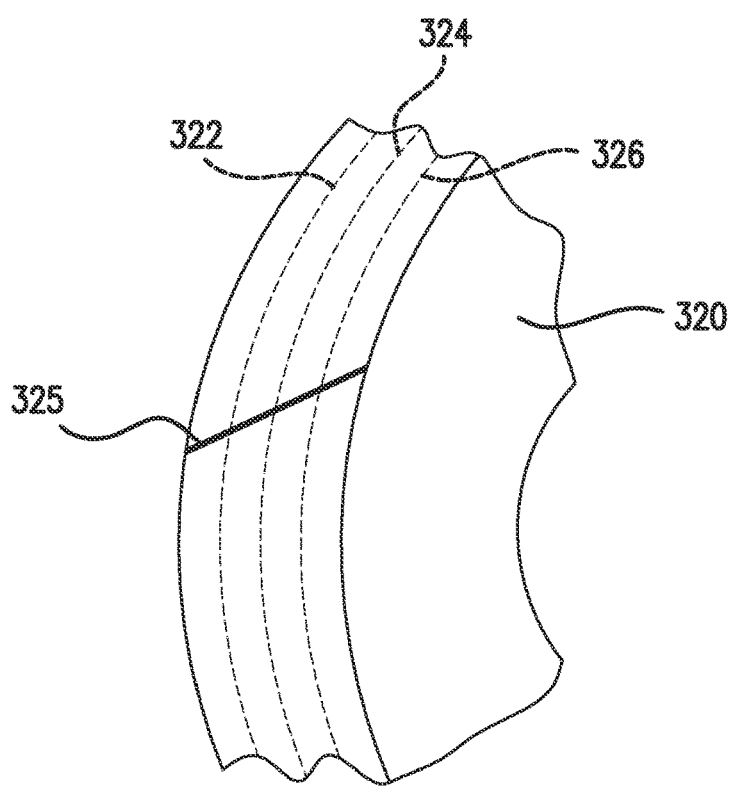
FIG. 8 depicts radial run out measurements along multiple tracks about the surface of a tire according to example aspects of the present disclosure.

To determine the shape of the localized tire surface anomaly, the radial run out of the tire can be measured for multiple tracks along the surface of the tire. For instance, FIG. 8 depicts a tire 320 having a tread with an angled tread joint 325. The shape of the angled tread joint can be determined and/or approximated by measuring radial run out along multiple tracks across the width of the tire. For instance, radial run out can be measured along tracks 322, 324, and 326. The radial run out data from the multiple tracks can be analyzed to determine the shape of the tread joint (e.g. whether the tread joint is angled or straight).

In yet another implementation, the at least one identifiable characteristic can be identified from a tread surface map. In particular, the tread heights for the data points in the tread surface map associated with the identified localized tire surface anomaly can provide information including the location of the localized tread surface anomaly, the size of the localized tread surface anomaly, and the shape of the localized tread surface anomaly.

In a particular implementation of the present disclosure, determining at least one identifiable characteristic of the localized tire surface anomaly can include determining an approximate location of the localized tire surface anomaly in the tread of the tire. The tread of the tire can then be scanned using a suitable scanning probe at the approximate location to identify the at least one identifiable characteristic of the localized tire surface anomaly.

More particularly, the approximate location of the localized tire surface anomaly can be determined based on visual inspection or by one or more computing devices based on data associated with the tire, such as tire manufacturing data, radial run out data, and/or a tread surface map. Once the approximate location of the localized tire surface anomaly has been determined, a scanning probe (e.g. a laser scanning probe, an optical scanning probe, a sonic scanning probe, or other probe) can scan the surface of the tread of the tire to measure tread heights for various points on the tread at the approximate location to determine the size and shape of the tread surface anomaly.

Referring back to FIG. 6 at (208), the method (200) can include determining a material removal pattern to correct for the tire surface anomaly. The material removal pattern can specify a material removal depth (e.g. a depth of tire material to be removed) as a function of position about the tread of the tire. The material removal pattern can be determined based on the at least one identifiable characteristic associated with the localized tire surface anomaly. For instance, the material removal depth specified for a particular position on the tread of the tire can be determined based on the size and/or shape of the localized tire surface anomaly.

In a particular implementation of the present disclosure, it is desirable to only remove the localized tire surface anomaly that contacts the ground. For instance, in the case of a tread joint, it may be desirable to avoid correction of the tread joint in the grooves of the tire tread to avoid removal of material at the wear bars of the tire. As a result, determining a material removal pattern can include determining a position of one or more grooves in the tread of the tire and determining the material removal pattern based at least in part on the position of the one or more grooves such that tire material is not removed from the grooves of the tire. The position of the grooves can be determined in any suitable manner, such as from tire manufacturing data associated with the tire, radial run out measurements for the tire, and/or a tread surface map associated with the tire.

In one implementation, the position of the grooves in the surface of the tire can be accounted for by determining a convex hull for the tire. In particular, radial run out measurements can be filtered to select measurements that lie on a convex hull surrounding the entire set of radial run out measurements. An example technique for filtering data in this manner is disclosed in WO2010/0080571 which is commonly assigned to the assignee of the present disclosure and which is incorporated by reference herein to the extent its teaching are consistent with the present disclosure. The identifiable characteristics of the localized tire surface anomaly and/or the material removal pattern can be determined based on the filtered data.

At (210), tire material can be removed from the tread of the tire according to the material removal pattern. An ablation device can be used to remove the material from the tread of the tire. Laser ablation can be employed as a removal technique because it is able to accomplish removal depths and areas with precise control to correct for the localized tire surface anomaly. To the extent that other rubber removal techniques, such as but not limited to sandblasting, water jet removal and the like may be implemented to achieve the same precision levels as laser ablation, the present subject matter may also employ such alternative removal techniques.

Example System for Improving Tire Uniformity

Figure 9:
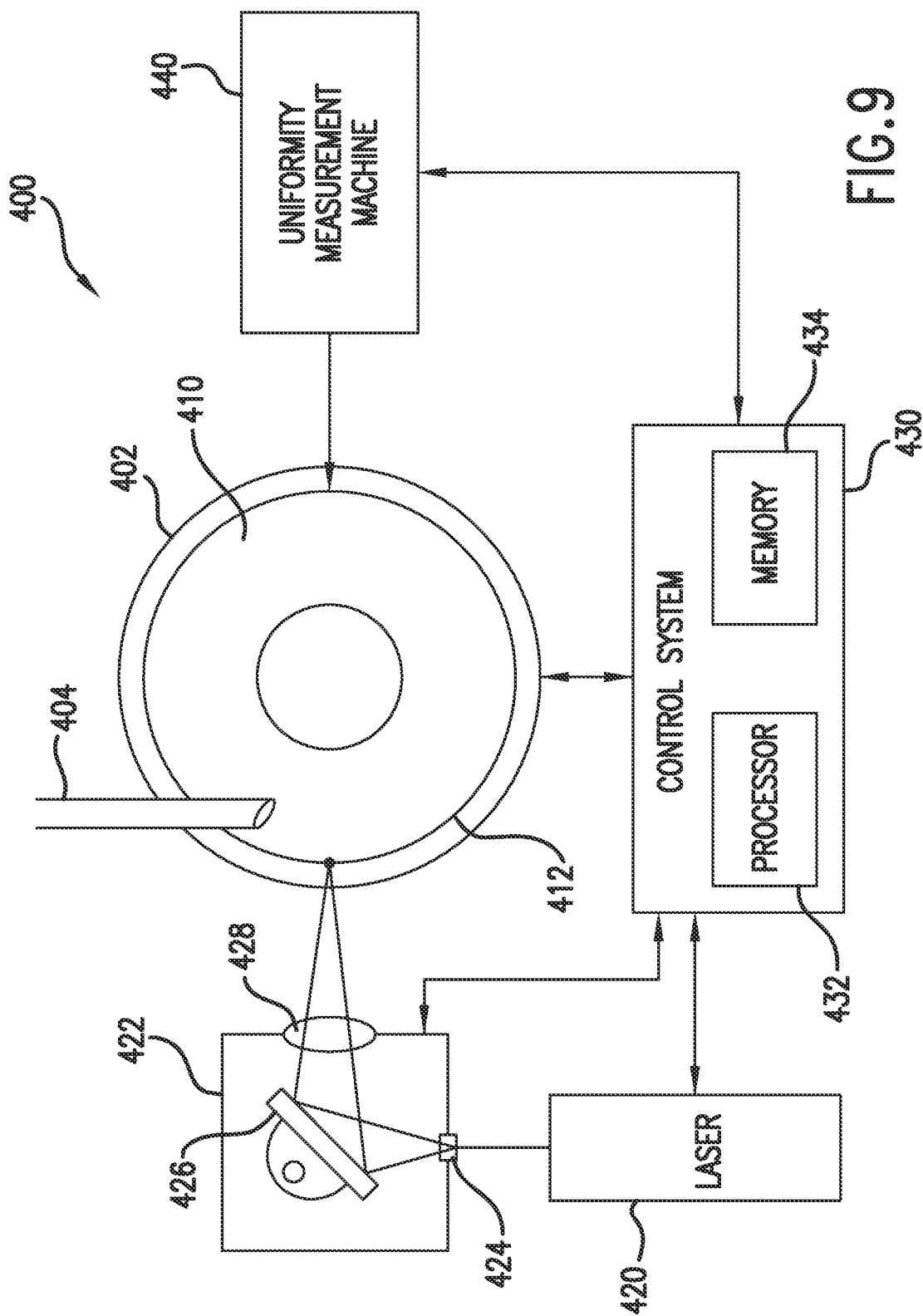
FIG. 9 depicts an example system for improving the uniformity of a tire according to example aspects of the present disclosure.

FIG. 9 illustrates a block diagram of an example system 400 for improving the uniformity of a tire using laser ablation. As shown, a tire 410 is securely mounted to a mounting fixture 402, which generally serves as a hub to hold the tire tread 412 relative to a laser ablation device 408. The tire fixture can rotate the tire relative to the laser ablation device 408 or can hold the tire stationary relative to the laser ablation device 408. Laser ablation device 408 can include a laser 420, which can include a fixed-point or sheet-of-light laser system that outputs a laser beam 421 having a sufficient amount of power to perform selective removal of tire rubber material. In one particular example, laser 420 can include a carbon dioxide ($CO_2$) laser. After output by laser 420, laser beam 421 can be provided to a deflection element 422, which can include a beam splitter 424, deflector 426, imaging lens 428, and/or other optical elements. Imaging lens 428 can focus the illumination of the laser beam 421 to a focal point 414 on the tread 412 of the tire 410 to remove rubber material from the tread 412 of the tire 410 to correct for a localized tire surface anomaly. The laser ablation device 408 can be rotated relative to the tire or can be held stationary relative to the tire.

The system of FIG. 4 is intended to illustrate laser ablation using a single laser and single focal point. However, it should be appreciated that multiple lasers be used to perform ablation at multiple focal points. A vacuum 404 or other cleaning tool may be provided to extract any removed rubber or other waste from the ablation area. Additional outlets may provide a controlled output of gaseous medium (e.g., a nitrogen gas) to facilitate laser ablation and suppress potential flames at the ablation point.

The system 400 can also include a uniformity measurement machine 440. The uniformity measurement machine 440 can be configured to measure radial run out and other uniformity parameters (e.g. radial force variation, lateral force variation, tangential force variation) of the tire 410. In general, such a uniformity measurement machine 440 can include sensors (e.g. laser sensors) to operate by contact, non-contact or near contact positioning relative to tire 410 in order to determine the relative position of the tire surface at multiple data points (e.g., 128 points) as it rotates about a center line. The uniformity measurement machine 440 can also include a wheel used to load the tire to obtain force measurements as the tire 410 is rotated.

As shown in FIG. 4, the system 400 can include a control system 430 to control various aspects of the system 400, such as the laser ablation device 408, the tire fixture 402, and/or the uniformity measurement machine 440. For instance, the control system 430 can be configured to control one or more components of the laser ablation device 408 to achieve a material removal pattern along the tread of the tire. The computer control system 430 can generally include such components as at least one memory/media element 434 or database for storing data and computer-readable instructions as well as at least one processor 432.

In the particular example of FIG. 4, a processor(s) 432 and associated memory 434 are configured to perform a variety of computer-implemented functions. The memory 434 can store software and/or firmware in the form of computer-readable and executable instructions that will be implemented by the processor(s) 432. Memory 434 can also store data which is accessible by processor(s) 432 and which can be acted on pursuant to the software instructions stored in the memory 434. Processor(s) 432 can include any suitable processing device, such as a microprocessor, microcontroller, or other suitable processor. Memory 434 can be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

According to aspects of the present disclosure, memory 434 can store instructions that when executed by the processor 432 cause the processor to perform operations. For instance, the instructions can cause the processor 432 to perform operations to improve the uniformity of a tire according to any of the methods disclosure herein, such as the method 200 depicted in FIG. 6.

In one implementation, the instructions when implemented by the processor 432 of FIG. 9 can cause the control system 430 to be configured to identify a local peak of radial run out from a plurality of radial run out measurements and to determine a material removal pattern based at least in part on the local peak of radial run out. The material removal pattern can specify a material removal depth for removing material from the tread of the tire to correct for the local peak of radial run out. The instructions when implemented by the processor 432 can further cause the control system 430 to be configured to control the tire fixture 402 and the laser ablation device 408 to remove tire material from the tread 412 of the tire 410 according to the material removal pattern.

The computer control system 430 can control the ablation of the tread of the tire according to the material removal pattern using a plurality of direct address commands. The direct address commands can specify operating parameters for discrete ablation segments at specific positions or "addresses" on the tread of the tire. More particularly, the desired material removal pattern can be broken down into a plurality of discrete ablation segments. These ablation segments represent small portions of the total material removal pattern that will be removed in incremental fashion by the ablation device. Multiple rows and columns of ablation segments can be imposed at positions on the tire to achieve a desired material removal depth specified by a material removal pattern. The ablation segments can be slightly offset from one another to preserve the aesthetic appearance of the tread of the tire.

The direct address commands specify locations and other parameters for the plurality of discrete ablation segments to achieve a desired material removal pattern. Exemplary techniques for determining direct address commands from one or more material removal patterns are disclosed in PCT/US11/66699, which is commonly assigned to the assignee of the present disclosure and which is incorporated by reference herein to the extent its teaching are consistent with the present.

In a particular example, the ablation segments can be associated with a bitmap image which correlates the ablation depth along a specified track to a varied-tone graphic image (e.g., having color or grayscale variations) representative of such depths. Such varied-tone images can be interpreted by software control of the ablation device to produce desired ablation depths at specific angular locations on the tread of the tire.

EXAMPLES

Figure 10:
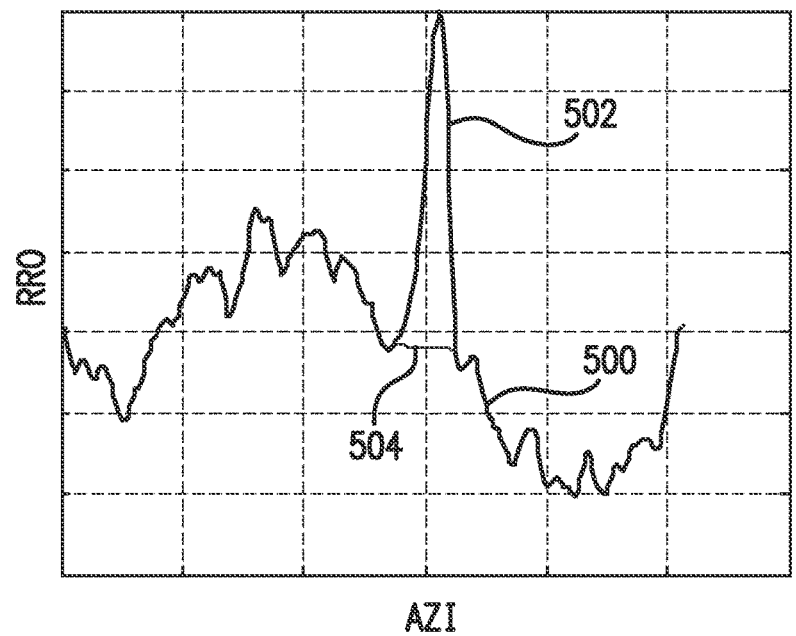
FIGS. 10-17 depict example simulation results obtained for improving the uniformity of a tire according to example aspects of the present disclosure.

FIGS. 10-17 depict example simulation results for improving the uniformity of a tire according to example aspects of the present disclosure. FIG. 10 depicts a simulated radial run out waveform 500 for a first tire. FIG. 10 plots azimuth along the abscissa and magnitude of radial run out along the ordinate. The radial run out waveform 500 includes a local peak of radial 502. Removal of the local peak of radial run out 502 according to aspects of the present disclosure replaces the local peak 502 with portion 504 of the radial run out waveform 500.

Figure 11:
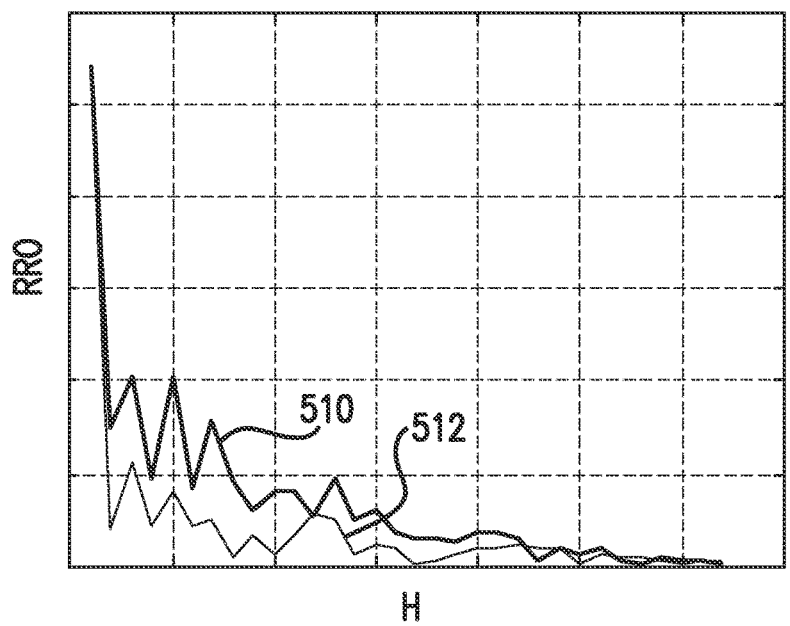

FIG. 11 depicts the harmonic distribution for the first tire both before and after removal of the local peak of radial run out 502. FIG. 11 plots harmonic number along the abscissa and magnitude of radial run out along the ordinate. Curve 510 represents the harmonic distribution of radial run out prior to removal of the local peak 502. Curve 512 represents the harmonic distribution of radial run out after removal of the local peak 502. Removal of the local peak 502 according to aspects of the present disclosure achieves a reduction across multiple harmonics (particular higher harmonics) of radial run out. The average amplitude of harmonics 1-32 before removal of the local peak 502 is 192 µm and the average amplitude of harmonics 1-32 after removal of the local peak 502 is 57 µm.

Figure 12:
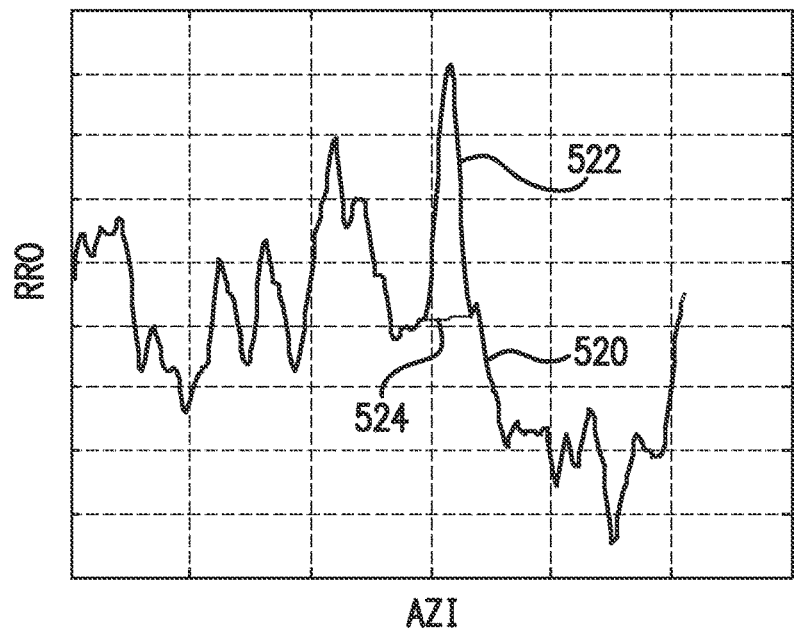

FIG. 12 depicts a simulated radial run out waveform 520 for a second tire. FIG. 12 plots azimuth along the abscissa and magnitude of radial run out along the ordinate. The radial run out waveform 520 includes a local peak of radial 522. Removal of the local peak of radial run out 522 according to aspects of the present disclosure replaces the local peak 522 with portion 524 of the radial run out waveform 520.

Figure 13:
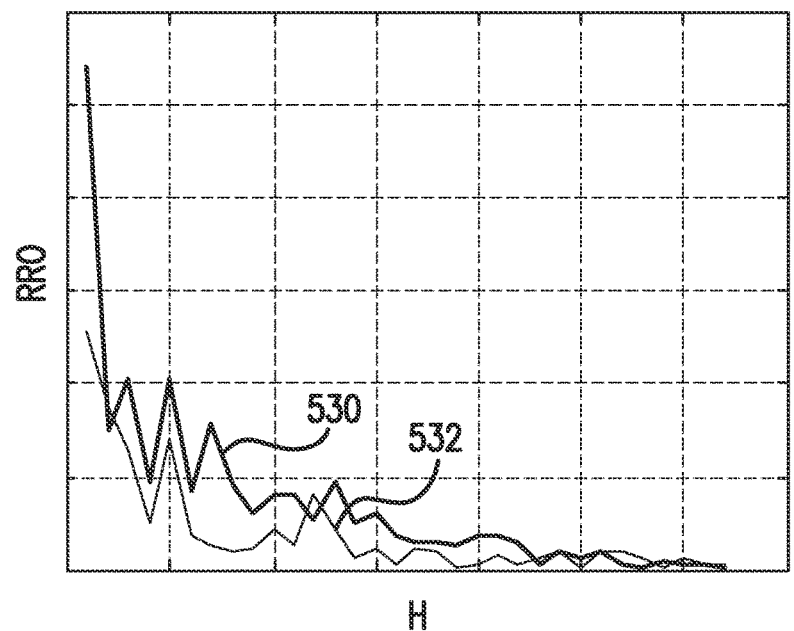

FIG. 13 depicts the harmonic distribution for the second tire both before and after removal of the local peak of radial run out 522. FIG. 13 plots harmonic number along the abscissa and magnitude of radial run out along the ordinate. Curve 530 represents the harmonic distribution of radial run out prior to removal of the local peak 522. Curve 532 represents the harmonic distribution of radial run out after removal of the local peak 522. Removal of the local peak 522 according to aspects of the present disclosure achieves a reduction across multiple harmonics (particular higher harmonics) of radial run out. The average amplitude of harmonics 1-32 before removal of the local peak 522 is 93 µm and the average amplitude of harmonics 1-32 after removal of the local peak 522 is 61 µm.

Figure 14:
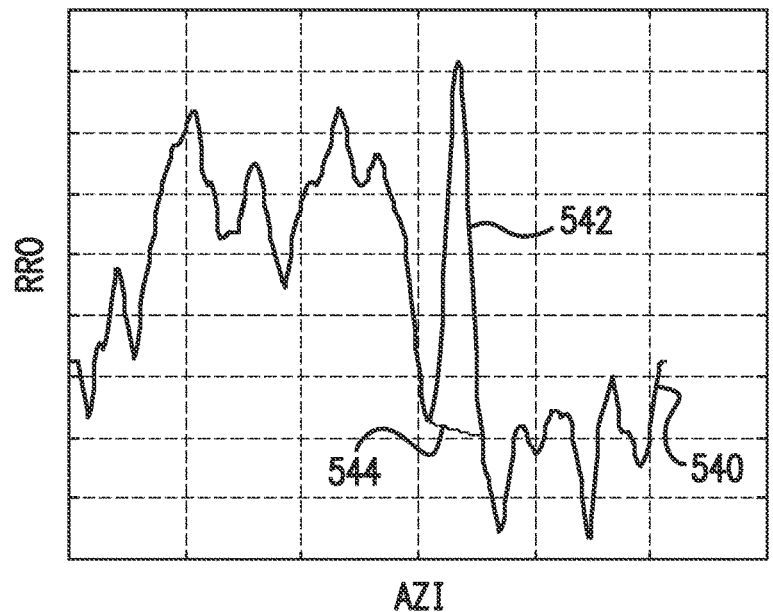

FIG. 14 depicts a simulated radial run out waveform 540 for a third tire. FIG. 14 plots azimuth along the abscissa and magnitude of radial run out along the ordinate. The radial run out waveform 540 includes a local peak of radial 542. Removal of the local peak of radial run out 542 according to aspects of the present disclosure replaces the local peak 542 with portion 544 of the radial run out waveform 540.

Figure 15:
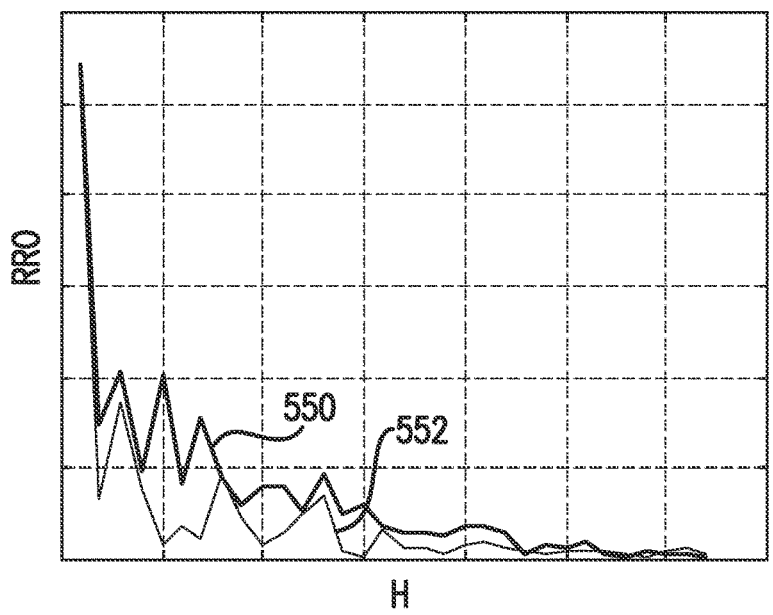

FIG. 15 depicts the harmonic distribution for the third tire both before and after removal of the local peak of radial run out 542. FIG. 15 plots harmonic number along the abscissa and magnitude of radial run out along the ordinate. Curve 550 represents the harmonic distribution of radial run out prior to removal of the local peak 542. Curve 552 represents the harmonic distribution of radial run out after removal of the local peak 542. Removal of the local peak 542 according to aspects of the present disclosure achieves a reduction across multiple harmonics (particular higher harmonics) of radial run out. The average amplitude of harmonics 1-32 before removal of the local peak 542 is 153 µm and the average amplitude of harmonics 1-32 after removal of the local peak 542 is 63 µm.

Figure 16:
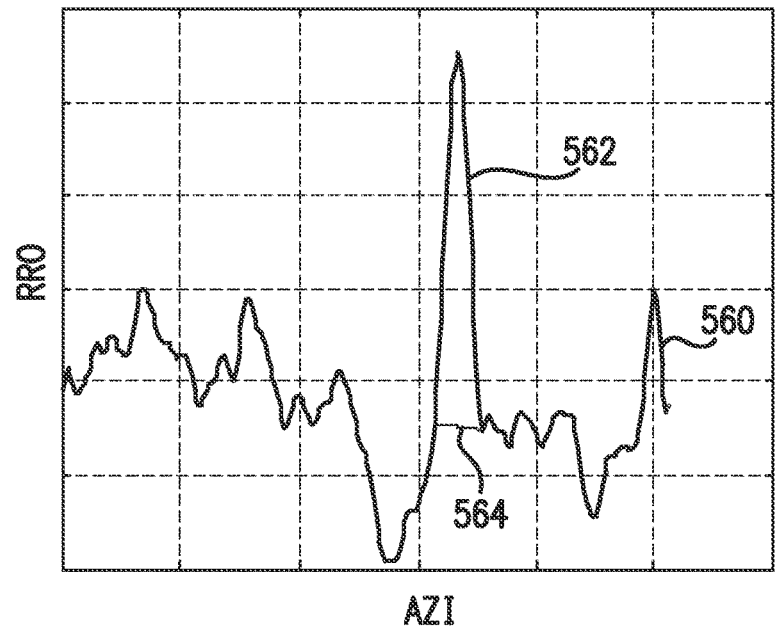

FIG. 16 depicts a simulated radial run out waveform 560 for a fourth tire. FIG. 16 plots azimuth along the abscissa and magnitude of radial run out along the ordinate. The radial run out waveform 560 includes a local peak of radial 562. Removal of the local peak of radial run out 562 according to aspects of the present disclosure replaces the local peak 562 with portion 564 of the radial run out waveform 560.

Figure 17:
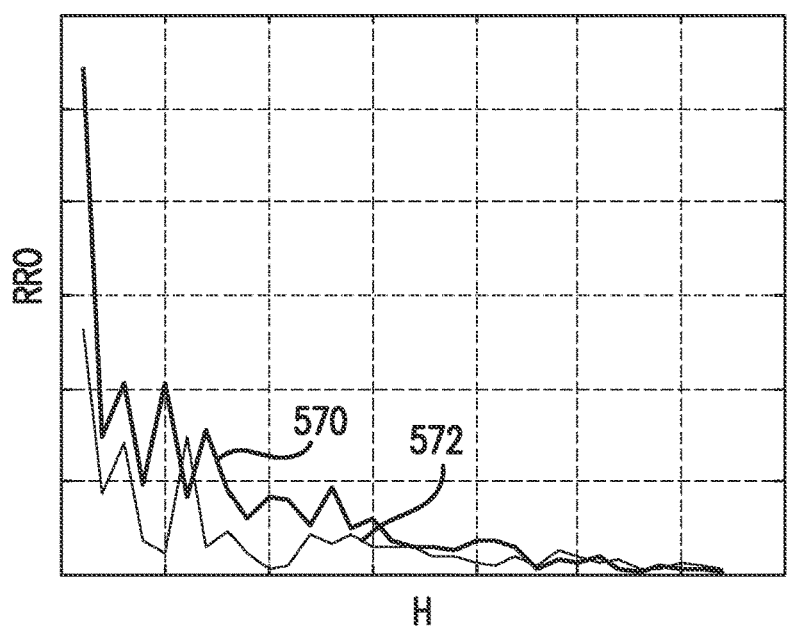

FIG. 17 depicts the harmonic distribution for the fourth tire both before and after removal of the local peak of radial run out 562. FIG. 17 plots harmonic number along the abscissa and magnitude of radial run out along the ordinate. Curve 570 represents the harmonic distribution of radial run out prior to removal of the local peak 562. Curve 572 represents the harmonic distribution of radial run out after removal of the local peak 562. Removal of the local peak 562 according to aspects of the present disclosure achieves a reduction across multiple harmonics (particular higher harmonics) of radial run out. The average amplitude of harmonics 1-32 before removal of the local peak 562 is 187 µm and the average amplitude of harmonics 1-32 after removal of the local peak 562 is 88 µm.

As demonstrated in FIGS. 10-17, correcting for a local peak of radial run out caused by a tire surface anomaly can improve radial run out across multiple harmonics. The reduction in radial run out at the higher harmonics (e.g. harmonics greater than 10) can result in reduced cavity noise for the tire.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for improving the uniformity of a tire, comprising:

identifying a tire having a tread for uniformity correction;

identifying at least one localized tire surface anomaly attributable to a tread joint on the tread of the tire, the localized tire surface anomaly comprising a local peak of radial run out, the local peak of radial run out being identified from a plurality of radial run out measurements obtained for the tire;

determining, by one or more computing devices, at least one identifiable characteristic of the localized tire surface anomaly, the at least one identifiable characteristic comprising a size of the tire surface anomaly and a shape of the tire surface anomaly;

determining, by the one or more computing devices, a material removal pattern to correct for the localized tire surface anomaly based at least in part on the at least one identifiable characteristic of the localized tire surface anomaly, the material removal pattern specifying a material removal depth for removing material from the tread of the tire at one or more azimuthal locations associated with the localized tire surface anomaly, the material removal pattern being determined based at least in part on the shape of the tire surface anomaly, the material removal depth being determined based at least in part on the size of the tire surface anomaly; and removing tire material from the tread of the tire according to the material removal pattern.

2. The method of claim 1, wherein the tire surface anomaly is a local peak of radial run out attributable to a tread joint.

3. The method of claim 1, wherein the at least one identifiable characteristic of the localized tire surface anomaly further comprises a location of the localized tire surface anomaly.

4. The method of claim 1, wherein the at least one identifiable characteristic of the localized tire surface anomaly is determined by the one or more computing devices based at least in part on a plurality of radial run out measurements about the tread of the tire.

5. The method of claim 4, wherein the radial run out measurements are obtained for a central track about the surface of the tread.

6. The method of claim 4, wherein the radial run out measurements are obtained for a plurality of tracks about the surface of the tread.

7. The method of claim 1, wherein the at least one identifiable characteristic of the joint is determined by the one or more computing devices based at least in part on a tread surface map of the tread of the tire.

8. The method of claim 1, wherein the at least one identifiable characteristic of the joint is determined by the one or more computing devices based at least in part on manufacturing data associated with the tire.

9. The method of claim 1, wherein determining; by the one or more computing devices, at least one identifiable characteristic of the localized tire surface anomaly comprises:

determining an approximate location of the localized tire surface anomaly in the tread of the tire; and scanning the tread of the tire at the approximate location of the localized tire surface anomaly using a scanning probe to identify the at least one identifiable characteristic of the localized tire surface anomaly.

10. The method of claim 9, wherein the approximate location of the localized tire surface anomaly on the tread of the tire is determined based at least in part on one or more of a plurality of radial run out measurements, a tread surface map, or manufacturing data associated with the tire.

11. The method of claim 9, wherein the scanning probe comprises a laser probe, an optical probe, a sonic probe or a camera probe.

12. The method of claim 1, wherein determining, by the one or more computing devices, a material removal pattern to correct for the localized tire surface anomaly based at least in part on the at least one identifiable characteristic of the localized tire surface anomaly, comprises:

determining, by the one or more computing devices, a position of one or more grooves in the tread of the tire; and determining the material removal pattern based at least in part on the position of the one or more grooves.

* * * * *